US010873557B2

(12) United States Patent
Goenka et al.

(10) Patent No.: US 10,873,557 B2
(45) Date of Patent: Dec. 22, 2020

(54) PUBLISHING MESSAGE CONVERSATIONS TO ELECTRONIC FORUMS

(71) Applicant: Yahoo Holdings, Inc., Sunnyvale, CA (US)

(72) Inventors: Mohit Goenka, Santa Clara, CA (US); Nikita Varma, Milpitas, CA (US); Ashish Khushal Dharamshi, Sunnyvale, CA (US)

(73) Assignee: Oath Inc., New York, NY (US)

( * ) Notice: Subject to any disclaimer, the term of this patent is extended or adjusted under 35 U.S.C. 154(b) by 54 days.

(21) Appl. No.: 15/826,888

(22) Filed: Nov. 30, 2017

(65) Prior Publication Data

US 2019/0166082 A1    May 30, 2019

(51) Int. Cl.
*H04L 12/58* (2006.01)
*G06F 40/30* (2020.01)
*G06F 40/151* (2020.01)

(52) U.S. Cl.
CPC ............ *H04L 51/32* (2013.01); *G06F 40/151* (2020.01); *G06F 40/30* (2020.01); *H04L 51/16* (2013.01)

(58) Field of Classification Search
CPC ..... H04L 51/32; H04L 51/16; G06F 17/2264; G06F 17/2785; G06F 40/30; G06F 40/151; G06F 16/957; G06F 16/958; G06Q 50/01
USPC ........................................................ 709/206
See application file for complete search history.

(56) References Cited

U.S. PATENT DOCUMENTS

| 5,208,748 A * | 5/1993 | Flores .................... G06Q 10/10 704/1 |
| 2009/0157819 A1 | 6/2009 | Hampton |
| 2011/0119593 A1* | 5/2011 | Jacobson ............... G06Q 30/02 715/736 |
| 2013/0173408 A1* | 7/2013 | Lindblom .......... G06Q 30/0283 705/26.1 |
| 2014/0344376 A1 | 11/2014 | Goldsmith et al. |
| 2017/0048170 A1* | 2/2017 | Smullen ................ H04L 67/322 |
| 2017/0083190 A1* | 3/2017 | Jacobson ............... G06Q 30/02 |

FOREIGN PATENT DOCUMENTS

| WO | 2007/021974 A2 | 2/2007 |
| WO | 2009/135418 A1 | 11/2009 |

* cited by examiner

*Primary Examiner* — Kristie D Shingles
(74) *Attorney, Agent, or Firm* — Cooper Legal Group, LLC (57) ABSTRACT

One or more computing devices, systems, and/or methods for publishing message conversations to electronic forums are provided. For example, a message conversation between users may be identified. A request to publish the message conversation to an electronic forum may be received. The message conversation may be processed to create a first conversation summary of the message conversation. The message conversation may be evaluated to create a title. A forum discussion comprising the title and a first post of the first conversation summary is created. The forum discussion is published to an electronic forum.

20 Claims, 8 Drawing Sheets

PUBLISHING MESSAGE CONVERSATIONS TO ELECTRONIC FORUMS

BACKGROUND

Many users communicate over various communication channels. For example, a group of users may communicate over email by sending and receiving messages associated with an email thread, such as emails relating to what new car to purchase. In another example, two users may communication through a phone or video conference call to discuss business. In this way, text messages, social network messages, emails, phone calls, video conference calls, and/or other communication channels can be used by user to communicate through computing devices.

During a message conversation, a user may determine that it would be beneficial to create a forum discussion published through an electronic forum, such as a blog posted through a public forum in order to share ideas of the message conversation and/or obtain additional commentary on the topic of the message conversation. In order to manually create the blog, the user must navigate to a blog creation interface. The user can then use the blog creation interface to define the blog, such as a title, description, etc. The user can either create a post for the blog with information related to the message conversation or the user can copy/paste content from the message conversation into the post. In this way, the user may spend substantial time and computing resources in order to manually create and update the blog based upon the message conversation.

SUMMARY

In accordance with the present disclosure, one or more computing devices and/or methods for publishing message conversations to electronic forums are provided. In one example, a message conversation between one or more users may be identified, such as a text message conversation, an email conversation, a social network message or post conversation (e.g., comments and replies to a post), a phone conversation translated into text, audio of a video conference conversation translated into text, etc. A request may be received to publish the message conversation to an electronic forum, such as posting a blog to a public forum. For example, in response to identifying the message conversation, a user interface element for requesting automatic publishing of the message conversation may be displayed to the one or more users, such as through a button on a message user interface displaying the message conversation or through a message sent to the users.

The message conversation may be processed to create a first conversation summary of the message conversation. In one example, the first conversation summary comprises the entire message conversation. In another example, the first conversation summary comprises a portion of the message conversation such as content from the last two messages. In another example, the message conversation is parsed using various functionality (e.g., topic extraction functionality, semantic analysis functionality, summarization creation functionality, keyword extraction, etc.) to programmatically create a summary based upon content parsed from the message conversation (e.g., text of an email body, a subject of an email, content within attachments, etc.). In this way, various techniques may be used to create conversation summaries. In one example, the message conversation may be evaluated to identify a title to use for publishing the message conversation (e.g., a title derived from an email subject line).

In this way, a forum discussion (e.g., the blog) is created to comprise the title and a first post comprising the first conversation summary. The forum discussion may be published to the electronic forum. In one example, the forum discussion is published if the users engaging in the message conversation give consent. In one example, the users may provide an instruction to auto-publish subsequent messages of the message conversation to the forum discussion. In this way, the blog may be automatically created and updated based upon the message conversation.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
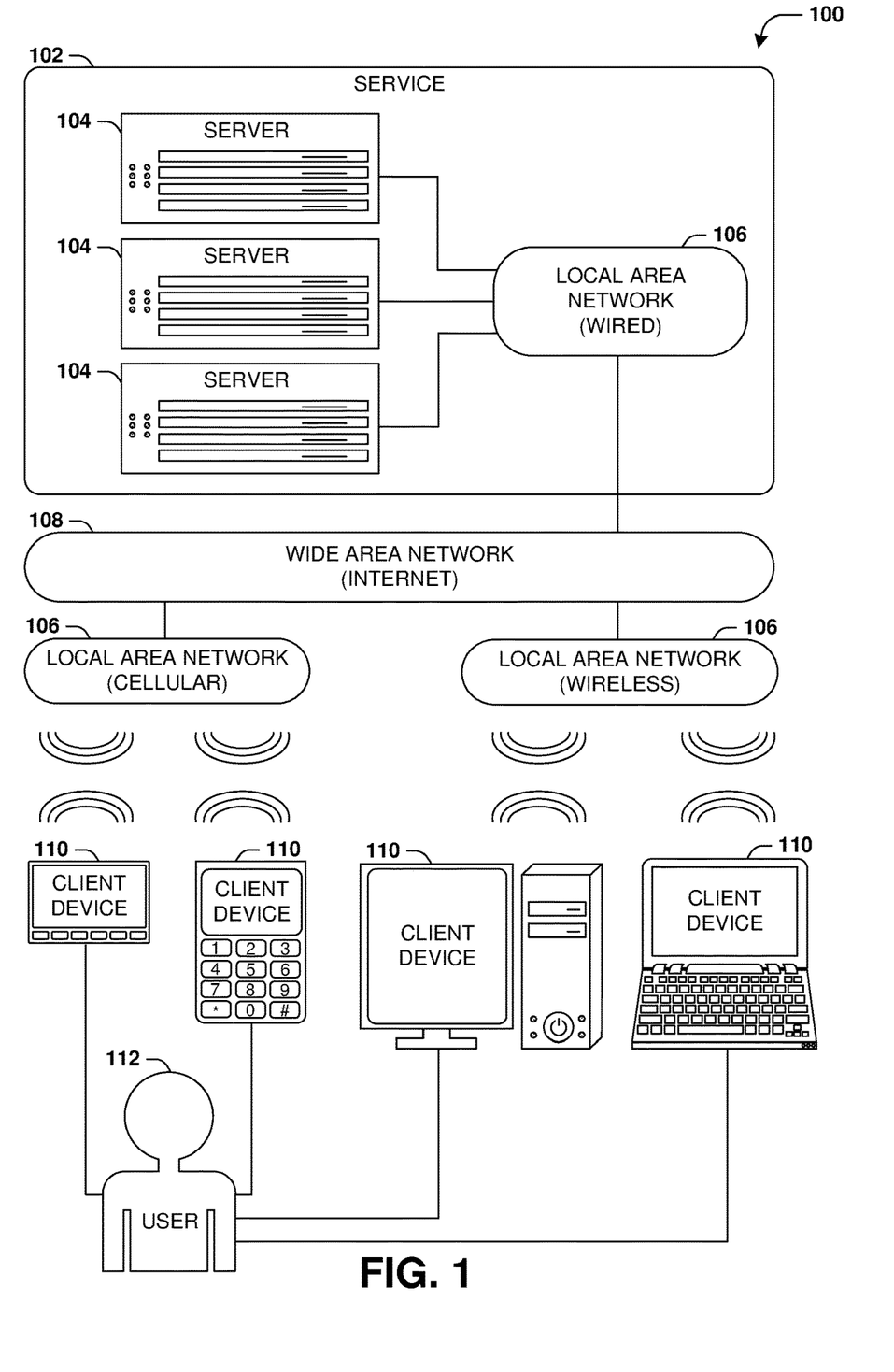
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
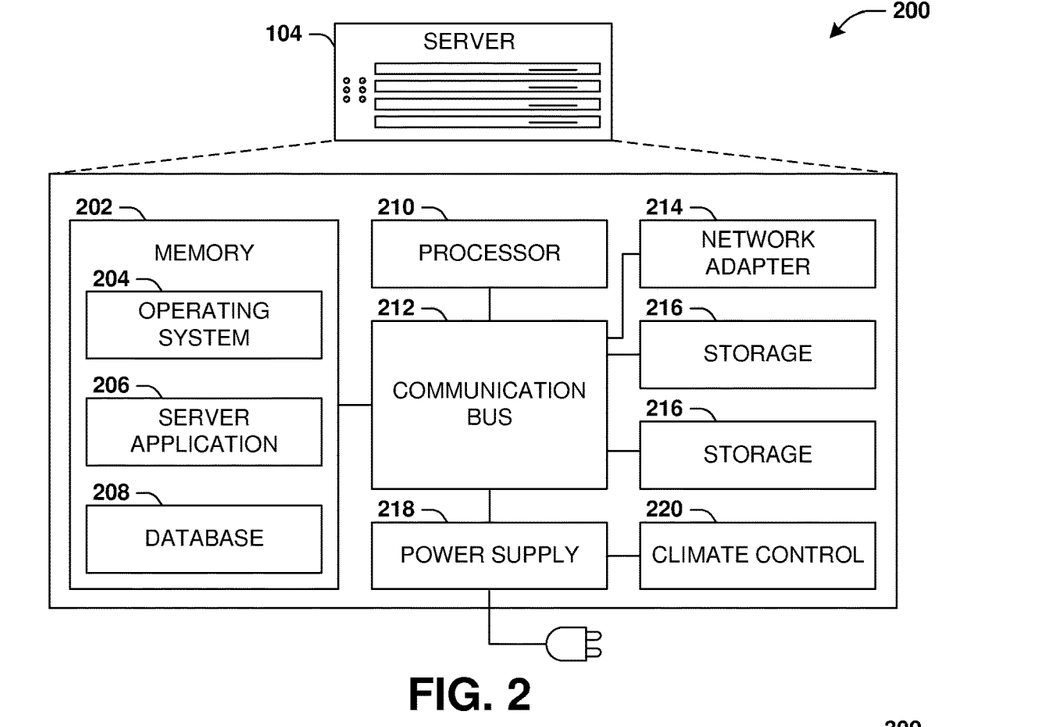
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
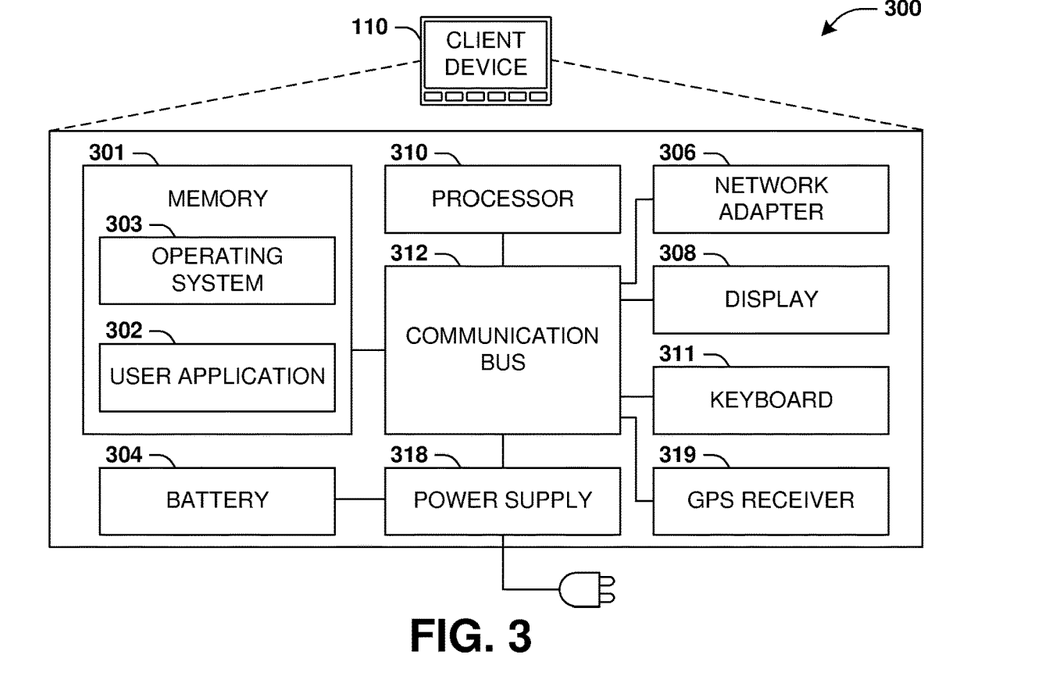
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for publishing message conversations to electronic forums are provided. For example, users may be actively discussing a stereo system purchase through an email thread. During the message conversation of the stereo system purchase, a user may determine that it would be beneficial to post the message conversation to an electronic forum, such as by posting a blog through a public forum, in order to get the opinions of other users not included in the email thread. Unfortunately, the user would have to manually access a blog creation interface, create the blog, and then copy/paste content or reenter content from the email thread to the blog, which wastes time and computing resources.

Accordingly, as provided herein, message conversations may be automatically transformed into forum discussions, such as blogs, to post through electronic forums. Message conversations may be automatically transformed in response to participants of a message conversation giving permission. As new messages occur within the message conversation, the forum discussion may be automatically updated with new content from the new messages. In this way, users do not have to waste time and computing resources to manually create blogs or other forum discussions.

Figure 4:
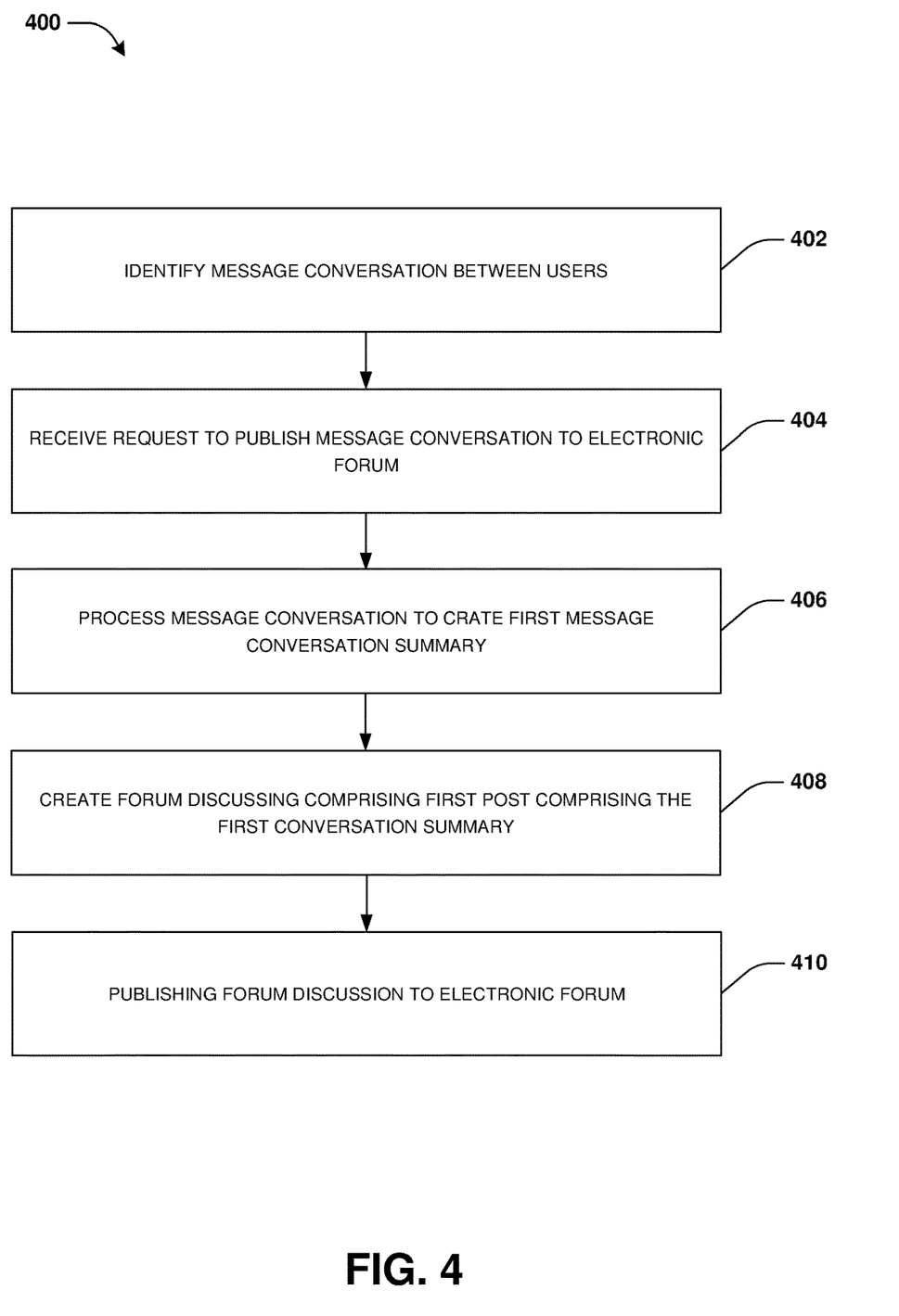
FIG. 4 is a flow chart illustrating an example method for publishing message conversations to electronic forums.

An embodiment of user authentication is illustrated by an example method 400 of FIG. 4. At 402, a message conversation between users, such as a first user, a second user, and/or any other users, may be identified. The message conversation may be an email thread, a text message conversation, a social network post (e.g., comments and replies to a post), a social network message conversation, a phone call translatable into text, a video conference translatable into text, etc. The message conversation may be facilitated through messages that are transmitted over a network between computing devices of participants.

At 404, a request may be received to publish the message conversation to an electronic forum, such as to publish a blog or article to a forum. In one example, a user interface element (e.g., a button) or link may be rendered through a user interface, such as a messaging user interface populated with messages of the message conversation, so that a user can interact with the user interface element or link in order to create the request. In another example, a message may be added to the message conversation or sent as a separate individual message with the user interface element or a link that can be used to create the request. In one example, messages requesting permission to publish the message conversation as a forum discussion through an electronic forum may be transmitted to computing devices of all of the participants. All or a subset of participants giving permission may be required before the forum discussion is created and/or published.

In one example, the request may comprise an instruction or rule to auto-publish subsequent messages of the message conversation to the forum discussion. In this way, the forum discussion will be automatically updated with new posts corresponding to new messages of the message conversation. The instruction or rule may be revoked in response to receiving an instruction to revoke auto-publishing. In another example, the request may comprise an instruction or rule to not auto-publish subsequent messages of the message conversation to the forum discussion. In this way, participants of the message conversation may be first asked for permission to update the forum discussion when new messages are identified.

In one example, the request may comprise an instruction to include only certain types of content from the message conversation to post to the forum discussion. In one example, the request may specify that attached photos, but not message text or other attachments, are to be used to create posts for the forum discussion. In another example, the request may specify that text and videos, but no other type of content, are to be used to create posts for the forum discussion. The types of content that are to be included and excluded from posts may be updated any time, and thus may be applied retroactively to modify prior posts to conform or may be applied to merely posts from subsequent messages of the message conversation.

At 406, the message conversation may be processed to create a first conversation summary of the message conversation. If an instruction exists regarding what type of content from the message conversation to include or exclude, then the message conversation is parsed according to the instruction so that the first conversation summary includes allowed types of content and excludes restricted types of content. In one example, text, attachments, embedded photos, and/or other content of messages within the message conversation may be used to create the first conversation summary (e.g., replication of such content). In another example, the content of the message may be evaluated using various types of functionality (e.g., topic extraction functionality, semantic analysis functionality, summarization creation functionality, keyword extraction, etc.) to programmatically create a summary based upon content parsed from the message conversation. In this way, the first conversation summary may be created. A title for the forum discussion may be determined based upon the message conversation, such as a title derived from an email subject line.

At 408, a forum discussion, such as a new blog, is programmatically (e.g., automatically) created to comprise a first post comprising the first conversation summary. The forum discussion may be created with the title. At 410, the forum discussion may be published to the electronic forum. A link to the forum discussion may be sent to the participants of the message conversation, such as through an email, a message within the message conversation, a text message, a user interface, etc. In one example, a contact list of a participant (e.g., an email contact list, a social network friends list, a phone contact list, etc.) may be evaluated to identify a set of users. A suggestion may be provided to the participant to send notifications to the set of users regarding the forum discussion. In this way, the notifications may be sent to the set of users using contact information from the contact list (e.g., automatically sent, sent in response to permission from the user, sent to a subset of user selected users, etc.).

In one example, the message conversation may be evaluated to identify a topic of the message conversation using various topic extraction and topic identification techniques. Content providers of content, such as websites, photos from a photo sharing service, videos, and/or other content from various content sources, may be queried using the topic to identify supplemental content associated with the topic (e.g., an article, a photo, a video, a social network post, a social network profile, a website, or other content relating to a stereo purchase topic being discussed through the message conversation). A suggestion may be provided to the participants of the message conversation to post the supplemental content to the forum discussion. In response to receiving an instruction to post the supplemental content, a new post of the supplemental content is posted to the forum discussion.

After the forum discussion has been published, a new message may occur within the message conversation. In response to identifying the new message, a determination is made as to whether an auto-publishing rule exists where new messages are to be automatically published to the forum discussion. If auto-publishing is enabled, then the new message is processed to create a second conversation summary (e.g., a summary of the new message or a summary of the entire message conversation or portion thereof). If a rule exists that only certain types of content are to be included within posts of the forum discussion, then the second conversation summary is created based upon such types of content within the new message. A second post comprising the second conversation summary may be created. The second post may be posted to the forum discussion. If auto-publishing is not enabled, then permission may be requested from the participants before the second post is created and posted to the forum discussion. If the new message comprises a content item that is the same as a content item previously included within the forum discussion, then the content item may be excluded from the second conversation summary (e.g., the new message comprises the same photo that was in a previous message posted to the forum discussion).

In one example, the message conversation may add a new user to the message conversation (e.g., a new recipient may be added to an email thread. Accordingly, upon identifying the new user, permission may be requested from the new user to having the message conversation published to the forum discussion. If the message conversation has already been published, then permission may be request to update the forum discussion with messages associated with the new user. In another example, deletion of a message within the message conversation may be detected. A corresponding post within the forum discussion may be deleted in response to the deletion of the message. In this way, changes to the message conversation may be reflected within the forum discussion.

Activity of the forum discussion may be monitored. For example, the forum discussion may be monitored for users adding comments to the forum discussion, posting to the forum discussion, "liking" posts within the forum discussion, sharing or email links to the forum discussion to other users, posting a link to the forum discussion through a social network and/or other interactions by users. Accordingly, in response to identifying user activity within the forum discussion, a notification of the user activity may be provided to the participants of the message conversation, such as through an email, a text message, a message posted to the message conversation, etc.

Figure 5A:
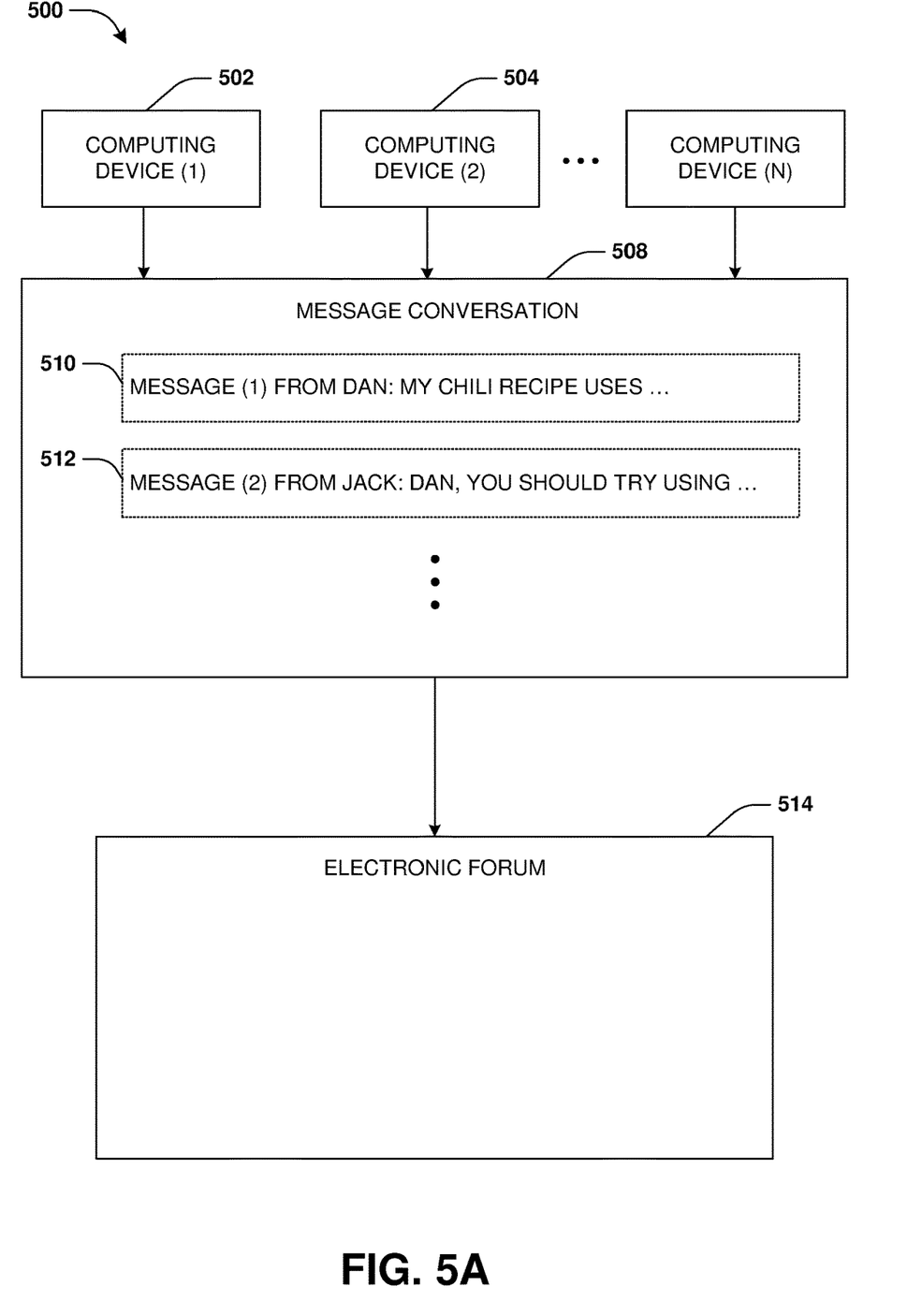
FIG. 5A is a component block diagram illustrating an example system for publishing message conversations to electronic forums, where a message conversation is identified.

FIGS. 5A-5D illustrate examples of a system 500 for publishing message conversations to electronic forums. FIG. 5A illustrates a first user of a first computing device 502, a second user of a second computing device 504, and/or other users of other computing devices engaging in a message conversation 508. For example, the users may be discussing chili recipes. The first user, Dan, may send a first message 510 regarding Dan's chili recipe through a message thread to the other users engaging in the message conversation 508. The second user, Jack, may respond to the message thread with a second message 512 regarding Jack's chili recipe. A user may submit a request to publish the message conversation 508 to an electronic forum 514. For example, the first user may click a button provided through a messaging user interface displaying the message conversation 508 in order to submit the request.

Figure 5B:
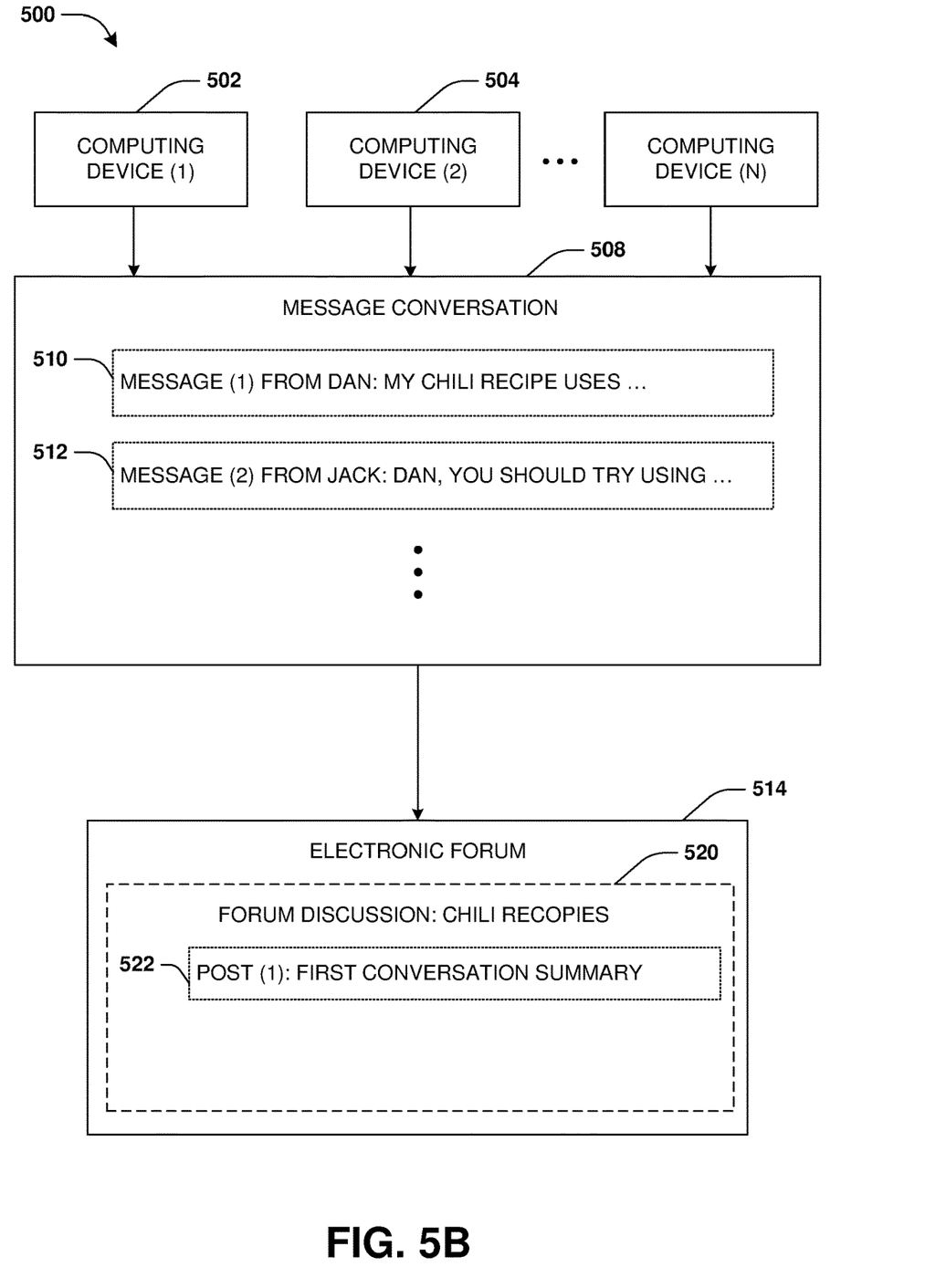
FIG. 5B is a component block diagram illustrating an example system for publishing message conversations to electronic forums, where a forum discussion is created and published.

FIG. 5B illustrates a forum discussion 520 being created based upon the message conversation 508. For example, the first message 510 and/or the second message 512 may be processed, such as where text is extracted/parsed, content from links is obtained (e.g., a link to a website may be extracted and/or a snapshot image of the website might be obtained), attachments are extracted/parsed, etc. The content of the messages may be evaluated to create a first conversation summary of the message conversation 508. The first conversation summary may comprise the full text, part of the text, or a summary derived from the text of the messages. The first conversation summary may comprise attachments or other embedded content, such as photos, videos, audio, etc. The first conversation summary may comprise links or content linked to by the links (e.g., a snapshot of a website, text of the website, a photo linked to by a link, etc.). In this way, a forum discussion 520 comprising a first post 522 of the first conversation summary may be created. A title of chili recipes may be derived from a topic determined from the message conversation 508 and is used to title the forum discussion 520.

Figure 5C:
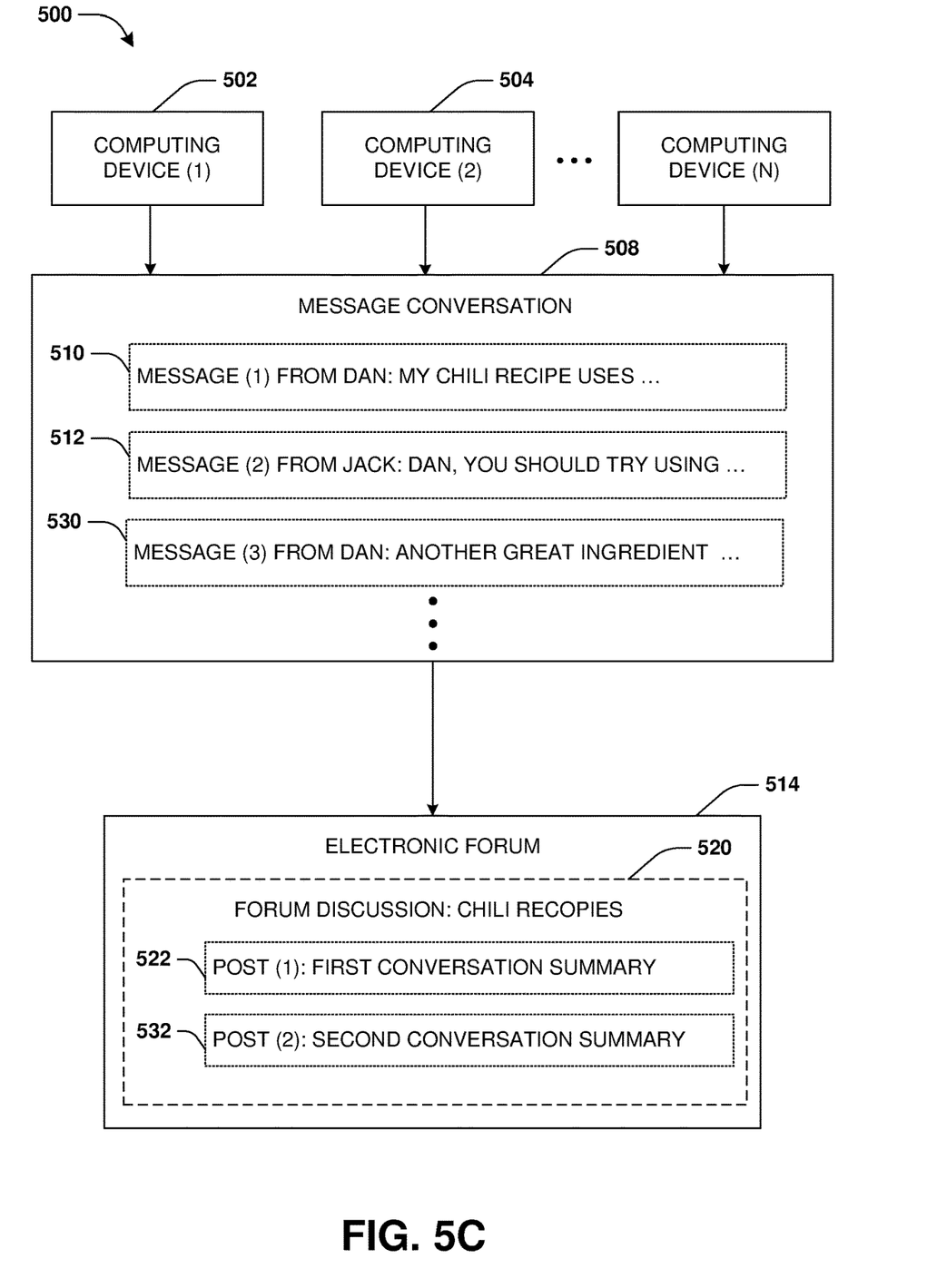
FIG. 5C is a component block diagram illustrating an example system for publishing message conversations to electronic forums, where a second post is posted to a forum discussion.

FIG. 5C illustrates a new message occurring within the message conversation 508. For example, the first user may send a third message 530 through the message thread regarding another great chili ingredient. A determination is made as to whether auto-publishing is enabled for new messages occurring within the message conversation 508. If auto-publishing is enabled, then the third message 530 is processed to create a second conversation summary (e.g., a summary of merely the third message 530 or a summary of the third message 530 and/or other messages such as the first message 510, the second message 512, and/or another new message not yet posted to the forum discussion 520 so that multiple new messages not yet posted to the forum discussion are summarized together within the single second conversation summary). In this way, a second post 532 of the second conversation summary is posted to the forum discussion 520. If auto-publishing is not enabled, then one or more users of the message conversation 508 may be asked for permission to create and post the second post 532.

Figure 5D:
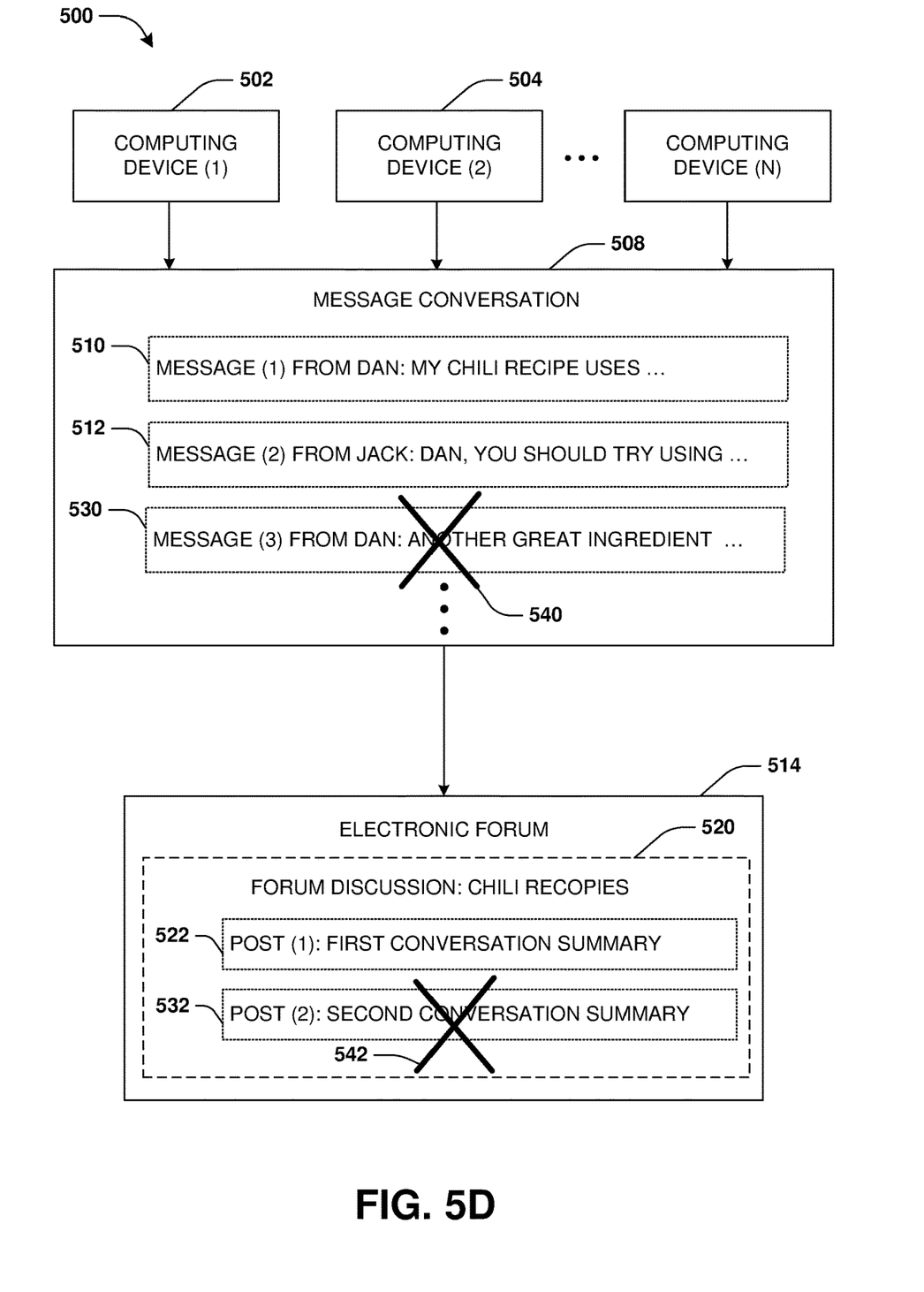
FIG. 5D is a component block diagram illustrating an example system for publishing message conversations to electronic forums, where a second post is removed from a forum discussion.

FIG. 5D illustrates a user of the message conversation 508, such as the first user, deleting 540 the third message 530. The deletion 540 of the third message 530 may be identified. In one example, the second post 532 derived from the third message 530 may be automatically removed 542 from the forum discussion. In another example, the users of the message conversation 508 may be asked as to whether the second post 532 should be removed 542 from the forum discussion. If permission to remove 542 the second post 532, then the second post 532 is removed 542 from the forum discussion.

Figure 6:
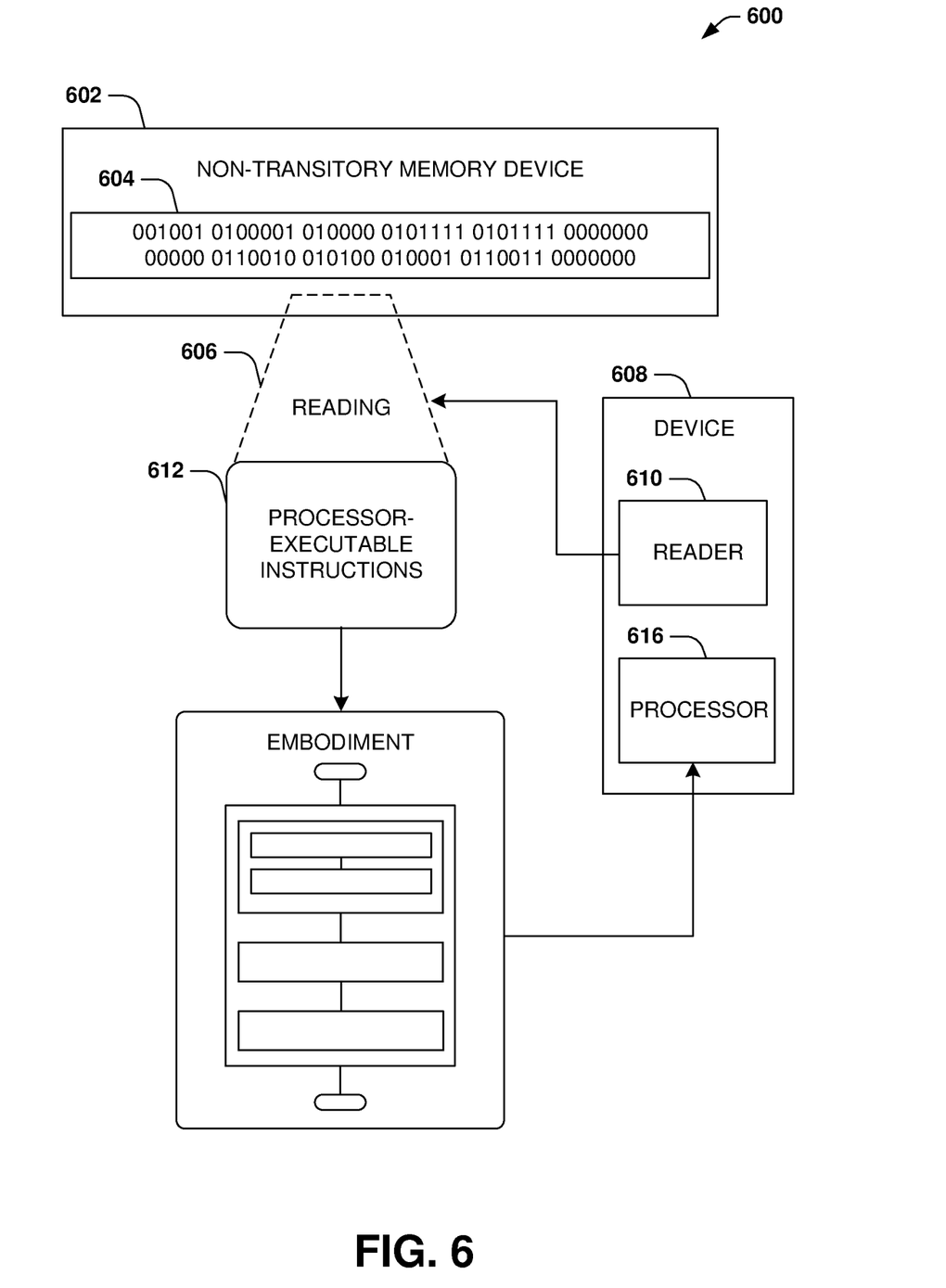
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of publishing message conversations to electronic forums, comprising:
    executing, on a processor of a computing device, instructions that cause the computing device to perform operations, the operations comprising:
        identifying a message conversation between a first user and a second user, wherein the message conversation is facilitated over a network between a first computing device of the first user and a second computing device of the second user;
        receiving a request to publish the message conversation to an electronic forum available to a plurality of computing devices over the network;
        processing the message conversation to create a first conversation summary of the message conversation;
        creating a forum discussion comprising a first post comprising the first conversation summary, wherein the first conversation summary comprises a first conversation message of the first user and a second conversation message of the second user;
        transmitting a first message, requesting permission from the first user to publish the forum discussion, comprising the first conversation message of the first user, to the electronic forum, over the network to the first computing device;
        transmitting a second message, requesting permission from the second user to publish the forum discussion, comprising the second conversation message of the second user, to the electronic forum, over the network to the second computing device; and
        in response to receiving at least one of a first response message to the first message from the first user or a second response message to the second message from the second user, giving permission to publish the forum discussion to the electronic forum, publishing the forum discussion, comprising the first conversation message of the first user and the second conversation message of the second user, to the electronic forum.

2. The method of claim 1, comprising:
    receiving one or more subsequent messages of the message conversation after the creating the forum discussion; and
    automatically updating the forum discussion with new posts corresponding to the one or more subsequent messages of the message conversation.

3. The method of claim 1, comprising:
    receiving an instruction to auto-publish subsequent messages of the message conversation to the forum discussion;
    identifying a new message of the message conversation;
    processing the new message to create a second conversation summary;
    creating a second post comprising the second conversation summary; and
    posting the second post to the forum discussion.

4. The method of claim 3, comprising:
in response to determining that the new message has been deleted, removing the second post from the forum discussion.

5. The method of claim 3, comprising:
determining that a content item within the new message is redundant with a prior content item included within a post of the forum discussion; and
excluding the content item from the second post.

6. The method of claim 1, comprising:
receiving an instruction to include a first type of content and exclude a second type of content from posts within the forum discussion; and
creating the first conversation summary to include content from the message conversation having the first type of content and to exclude content from the message conversation having the second type of content.

7. The method of claim 6, comprising:
receiving an instruction to auto-publish subsequent messages of the message conversation to the forum discussion;
identifying a new message of the message conversation;
processing the new message to create a second conversation summary, wherein the second conversation summary is created to include content from the second conversation summary having the first type of content and to exclude content from the second conversation summary having the second type of content;
creating a second post comprising the second conversation summary; and
posting the second post to the forum discussion.

8. The method of claim 1, comprising evaluating the message conversation to create a title, wherein the forum discussion comprises the title.

9. A computing device comprising:
a processor; and
memory comprising processor-executable instructions that when executed by the processor cause performance of operations, the operations comprising:
identifying a message conversation between a first user and a second user, wherein the message conversation is facilitated over a network between a first computing device of the first user and a second computing device of the second user;
receiving a request to publish the message conversation to an electronic forum available to a plurality of computing devices over the network;
processing the message conversation to create a first conversation summary of the message conversation;
evaluating the message conversation to create a title, wherein the title is derived from a topic determined from the message conversation;
creating a forum discussion comprising the title and a first post of the first conversation summary; and
publishing the forum discussion to the electronic forum.

10. The computing device of claim 9, wherein the operations comprise:
receiving one or more subsequent messages of the message conversation after the creating the forum discussion; and
automatically updating the forum discussion with new posts corresponding to the one or more subsequent messages of the message conversation.

11. The computing device of claim 9, wherein the operations comprise:
before the publishing the forum discussion, transmitting a first message over the network to the first computing device and a second message over the network to the second computing device, wherein the first message and the second message request permission to publish the forum discussion to the electronic forum;
wherein the publishing the forum discussion is performed in response to receiving at least one response message, from at least one of the first user or the second user, giving permission to publish the forum discussion to the electronic forum.

12. The computing device of claim 9, wherein the operations comprise:
receiving a rule to auto-publish subsequent messages of the message conversation to the forum discussion; and
automatically posting posts to the forum discussion of subsequently identified messages of the message conversation based upon the rule.

13. The computing device of claim 12, wherein the operations comprise:
receiving an instruction to revoke the rule; and
removing the rule based upon the instruction.

14. The computing device of claim 9, wherein the operations comprise:
evaluating a contact list of the first user to identify a set of users; and
sending notifications to the set of users regarding the forum discussion.

15. The computing device of claim 9, wherein the operations comprise:
querying a content provider to identify supplemental content associated with the topic; and
sending a suggestion to the first user to post the supplemental content to the forum discussion.

16. The computing device of claim 15, wherein the operations comprise:
in response to receiving an instruction from the first user to post the supplemental content, posting a second post comprising the supplemental content to the forum discussion.

17. A non-transitory machine readable medium having stored thereon processor-executable instructions that when executed cause performance of operations, the operations comprising:
identifying a message conversation between a first user and a second user;
receiving a request to publish the message conversation to an electronic forum available to a plurality of computing devices over a network;
processing the message conversation to create a first conversation summary of the message conversation;
creating a forum discussion comprising a first post of the first conversation summary;
publishing the forum discussion to the electronic forum;
receiving one or more subsequent messages of the message conversation after the creating the forum discussion; and
automatically updating the forum discussion with new posts corresponding to the one or more subsequent messages of the message conversation.

18. The non-transitory machine readable medium of claim 17, wherein the operations comprise:
receiving an instruction to include a first type of content and exclude a second type of content from posts within the forum discussion; and
creating the first conversation summary to include content from the message conversation having the first type of content and to exclude content from the message conversation having the second type of content.

19. The non-transitory machine readable medium of claim 17, wherein the operations comprise:
before the publishing the forum discussion, transmitting a first message over the network to a first computing device of the first user and a second message over the network to a second computing device of the second user, wherein the first message and the second message request permission to publish the forum discussion to the electronic forum;
wherein the publishing the forum discussion is performed in response to receiving at least one response message, from at least one of the first user or the second user, giving permission to publish the forum discussion to the electronic forum.

20. The non-transitory machine readable medium of claim 17, wherein the operations comprise:
evaluating the message conversation to create a title, wherein the title is derived from a topic determined from the message conversation.

\* \* \* \* \*